(12) United States Patent
Arzelier

(10) Patent No.: US 9,026,087 B2
(45) Date of Patent: May 5, 2015

(54) SOLVING CHARACTER DISPLAY AMBIGUITIES

(75) Inventor: Claude Jean-Frederic Arzelier, Cannes (FR)

(73) Assignee: BlackBerry Limited, Waterloo, Ontario (CA)

( * ) Notice: Subject to any disclaimer, the term of this patent is extended or adjusted under 35 U.S.C. 154(b) by 180 days.

(21) Appl. No.: 12/768,590

(22) Filed: Apr. 27, 2010

(65) Prior Publication Data

US 2011/0246178 A1  Oct. 6, 2011

(30) Foreign Application Priority Data

Apr. 2, 2010 (EP) .................................... 10290179

(51) Int. Cl.
*H04M 3/42* (2006.01)
*H04M 1/725* (2006.01)

(52) U.S. Cl.
CPC ...... *H04M 1/72552* (2013.01); *H04M 2250/58* (2013.01)

(58) Field of Classification Search
CPC ...... H04W 68/06; H04W 4/16; H04W 52/027
See application file for complete search history.

(56) References Cited

U.S. PATENT DOCUMENTS

| | | | | |
|---|---|---|---|---|
| 5,440,615 A * | 8/1995 | Caccuro et al. | ............ | 379/88.06 |
| 5,841,852 A * | 11/1998 | He | ............ | 379/207.15 |
| 6,311,180 B1 | 10/2001 | Fogarty | | |
| 2002/0059448 A1 | 5/2002 | Honeywood | | |
| 2003/0184451 A1 | 10/2003 | Li | | |
| 2003/0215074 A1 * | 11/2003 | Wrobel | ............ | 379/142.04 |
| 2005/0107083 A1 | 5/2005 | Rager et al. | | |
| 2005/0113088 A1 * | 5/2005 | Zinn et al. | ............ | 455/435.2 |
| 2006/0200568 A1 | 9/2006 | Kim | | |
| 2007/0283047 A1 | 12/2007 | Theis et al. | | |
| 2007/0298795 A1 | 12/2007 | Zinn et al. | | |
| 2008/0020761 A1 | 1/2008 | Park | | |
| 2008/0032736 A1 | 2/2008 | Bari et al. | | |
| 2008/0096559 A1 | 4/2008 | Phillips et al. | | |
| 2008/0126077 A1 | 5/2008 | Thorn | | |
| 2009/0018816 A1 * | 1/2009 | Noldus et al. | ............ | 704/8 |

(Continued)

FOREIGN PATENT DOCUMENTS

| | | |
|---|---|---|
| CN | 1832608 A | 9/2006 |
| CN | 1969264 A | 5/2007 |

(Continued)

OTHER PUBLICATIONS

3GPP TS 22.101 V11.0.0; 3rd Generation Partnership Project; Technical Specification Group Services and System Aspects; Service Aspects; Service Principles; Release 11; Sep. 2010; 60 pgs.

(Continued)

*Primary Examiner* — Rafael Pérez-Gutiérrez
*Assistant Examiner* — Keith Fang
(74) *Attorney, Agent, or Firm* — Conley Rose, P.C.; J. Robert Brown, Jr.

(57) ABSTRACT

A method for decoding an ambiguous character code. The method includes a user equipment (UE) receiving a character code that refers to a first character in a first language and to a second character in a second language. The method further includes the UE using language discrimination information available to the UE for other purposes to determine whether to display the first character or the second character.

12 Claims, 3 Drawing Sheets

| Hexadecimal Code | Hanzi-G (Chinese simplified) | Hanzi-T (Chinese traditional) | Kanzi (Japanese) | Hanja (Korean) | ChuNom (Vietnamese) |
|---|---|---|---|---|---|
| 6811 | X | X | | | |
| 6812 | X | X | | X | |
| 688C | X | X | | X | X |
| 689E | X | X | | | X |
| 688F | X | X | X | X | X |
| 6884 | X | X | X | | |
| Other example 1 | X | X | X | X | |
| Other example 2 | | | X | X | X |
| Other example 3 | X | X | X | | X |

Table 1

| MCC | Country |
|---|---|
| 460, 461 | China mainland |
| 466 | China Taiwan |
| 440, 441 | Japan |
| 450, 467 | Korea |
| 452 | Vietnam |
| 310-316 | USA |

Table 2

(56) References Cited

U.S. PATENT DOCUMENTS

| | | | |
|---|---|---|---|
| 2009/0088179 | A1 | 4/2009 | Stuempert et al. |
| 2010/0099455 | A1 | 4/2010 | Bari et al. |
| 2011/0032902 | A1 | 2/2011 | Kim |
| 2012/0066237 | A1 | 3/2012 | Chen et al. |

FOREIGN PATENT DOCUMENTS

| | | | |
|---|---|---|---|
| CN | 101304450 | A | 11/2008 |
| CN | 101542419 | A | 9/2009 |
| CN | 101587557 | A | 11/2009 |
| DE | 19831407 | A1 | 1/2000 |
| EP | 1770536 | A1 | 4/2007 |
| EP | 2048891 | A1 | 4/2009 |
| GB | 2456531 | A | 7/2009 |
| JP | 10215362 | A | 8/1998 |
| JP | 2000148754 | A | 5/2000 |
| JP | 2003348218 | A | 12/2003 |
| JP | 2004187006 | A | 7/2004 |
| JP | 2004187322 | A | 7/2004 |
| JP | 2004220158 | A | 8/2004 |
| JP | 2005517358 | A | 6/2005 |
| JP | 2006092496 | A | 4/2006 |
| JP | 2007172387 | A | 7/2007 |
| JP | 2008060950 | A | 3/2008 |
| JP | 2009116892 | A | 5/2009 |
| JP | 2009132158 | A | 6/2009 |
| JP | 2009533946 | A | 9/2009 |
| JP | 2010500791 | A | 1/2010 |
| KR | 10-2003-0088362 | A | 11/2003 |
| TW | 200307446 | A | 5/2003 |
| WO | 0004737 | | 1/2001 |
| WO | 0235369 | A1 | 5/2002 |
| WO | 03067860 | A1 | 8/2003 |
| WO | 2005121981 | A1 | 12/2005 |
| WO | 2007037677 | A1 | 4/2007 |
| WO | 2007117184 | A1 | 10/2007 |
| WO | 2008019297 | A3 | 2/2008 |
| WO | 2008065546 | A1 | 6/2008 |
| WO | 2009028555 | A1 | 3/2009 |

OTHER PUBLICATIONS

3GPP TS 23.122 V10.1.0; 3rd Generation Partnership Project; Technical Specification Group Core Network and Terminals; Non-Access-Stratum (NAS) Functions Related to Mobile Station (MS) in Idle Mode; Release 10; Sep. 2010; 41 pgs.

3GPP TS 24.301 V10.0.0; 3rd Generation Partnership Project; Technical Specification Group Core Network and Terminals; Non-Access-Stratum (NAS) Protocol for Evolved Packet System (EPS); Stage 3; Release 10; Sep. 2010; 299 pgs.

3GPP TS 24.008 V10.0.0; 3rd Generation Partnership Project; Technical Specification Group Core Network and Terminals; Mobile Radio Interface Layer 3 Specification; Core Network Protocols; Stage 3; Release 10; Sep. 2010; 616 pgs.

3GPP TS 22.042 V9.0.0; 3rd Generation Partnership Project; Technical Specification Group Services and System Aspects; Network Identity and Timezone (NITZ); Service Description Stage 1; Release 9; Dec. 2009; 8 pgs.

International Organization for Standardization/International Electrotechnical Commission; ISO/IEC Standard 10646:2011; Information Technology—Universal Coded Character Set (UCS); 2 pgs.

European Extended Search Report; EP Application No. 10290179.0; Dec. 6, 2010; 6 pages.

European Extended Search Report; EP Application No. 10290569.2; Mar. 9, 2011; 5 pages.

Arzelier, Claude Jean-Frederic et al.; U.S. Appl. No. 12/941,845, filed Nov. 8, 2010; Title: Displaying Characters and Images Based on Support.

European Examination Report; Application No. 10290179.0; Mar. 23, 2012; 19 pages.

PCT Written Opinion of the International Searching Authority; PCT Application No. PCT/EP2011/055193; Mar. 28, 2012; 5 pages.

PCT International Search Report; Application No. PCT/EP2011/068325; Jan. 25, 2012; 3 pages.

PCT Written Opinion of the International Searching Authority; Application No. PCT/EP2011/068325; Jan. 25, 2012; 5 pages.

PCT International Search Report; PCT Application No. PCT/EP2011/055193; May 13, 2011; 3 pages.

PCT Written Opinion of the International Searching Authority; PCT Application No. PCT/EP2011/055193; May 13, 2011; 5 pages.

International Telecommunication Union; ITU-T Telecommunication Standardization Sector of ITU; Complement to ITU-T Recommendation E.212; List of Mobile Country or Geographical Area Codes; Geneva, 2004; Jan. 1, 2004; 14 pgs.

3GPP TS 24.008 v9.1.0; 3rd Generation Partnership Project; Technical Specification Group Core Network and Terminals; Mobile Radio Interface Layer 3 Specification; Core Network Protocols; Stage 3; Release 9; Dec. 2009; 595 pgs.

3GPP TS 24.301 v9.1.0; 3rd Generation Partnership Project; Technical Specification Group Core Network and Terminals; Non-Access-Stratum (NAS) Protocol for Evolved Packet System (EPS); Stage 3; Release 9; Dec. 2009; 286 pgs.

Arzelier, Claude Jean-Frederic, et al.; U.S. Appl. No. 13/556,979, filed Jul. 24, 2012; Title: Displaying Characters and Images Based on Support.

Notice of Allowance dated Jun. 26, 2012; U.S. Appl. No. 12/941,845, filed Nov. 8, 2010; 26 pages.

PCT International Preliminary Report on Patentability; Application No. PCT/EP2011/05519; Jun. 21, 2012; 15 pages.

Arzelier, Claude Jean-Frederic, et al.; U.S. Appl. No. 13/829,154, filed Mar. 14, 2013; Title: Displaying Characters and Images Based on Support.

Notice of Allowance dated Feb. 22, 2013; U.S. Appl. No. 13/556,979, filed Jul. 24, 2012; 16 pages.

PCT International Preliminary Report on Patentability; Application No. PCT/EP2011/068325; Jan. 24, 2013; 12 pages.

3GPP TS 22.042 V8.0.0; 3rd Generation Partnership Project; Technical Specification Group Services and System Aspects; Network Identity and Timezone (NITZ); Service Description Stage 1; Release 8; Dec. 2008; 8 pages.

3GPP TS 24.008 V8.9.0; 3rd Generation Partnership Project; Technical Specification Group Core Network and Terminals; Mobile Radio Interface Layer 3 Specification; Core Network Protocols; Stage 3; Release 8; Mar. 2010; 591 pages.

3GPP TS 24.301 V9.2.0; 3rd Generation Partnership Project; Technical Specification Group Core Network and Terminals; Non-Access-Stratum (NAS) Protocol for Evolved Packet System (EPS); Stage 3; Release 9; Mar. 2010; 293 pages.

Office Action dated Oct. 5, 2012; U.S. Appl. No. 13/556,979, filed Jul. 24, 2012; 32 pages.

European Examination Report; Application No. 10290569.2; Apr. 12, 2013; 4 pages.

Japanese Office Action; Application No. 2013-501871; Sep. 13, 2013; 5 pages.

Chinese Office Action; Application No. 201180026817.0; Aug. 30, 2013; 6 pages.

3GPP TS 22.101 V8.14.0; 3rd Generation Partnership Project; Technical Specification Group Services and System Aspects; Service Aspects; Service Principles; Release 8; Dec. 2009; 54 pages.

PCT Written Opinion of the International Preliminary Examining Authority; Application No. PCT/EP2011/068325; Oct. 25, 2012; 5 pages.

Office Action dated Decemeber 30, 2013; U.S. Appl. No. 13/829,154, filed Mar. 14, 2013; 30 pages.

Australian Notice of Acceptance; Application No. 2011234396; Nov. 22, 2013; 2 pages.

Chinese Office Action; Application No. 201180026817.0; Aug. 30, 2013; 12 pages.

European Summons to Attend Oral Proceedings; Application No. 10290569.2; Apr. 28, 2014; 3 pages.

Notice of Allowance dated Apr. 18, 2014; U.S. Appl. No. 13/829,154, filed Mar. 14, 2013; 14 pages.

(56) References Cited

OTHER PUBLICATIONS

Taiwan Office Action; Application No. 100111938; Mar. 18, 2014; 12 pages.
Chinese Office Action; Application No. 201180026817.0; Feb. 8, 2014; 11 pages.
Korean Office Action; Application No. 10-2012-7028771; Feb. 19, 2014; 11 pages.
Chinese Office Action; Application No. 201180062132.1; Feb. 14, 2014; 7 pages.
Japanese Office Action; Application No. 2013-534325; Mar. 7, 2014; 8 pages.
Canadian Office Action; Application No. 2,794,797; Aug. 14, 2014; 2 pages.
Chinese Office Action; Application No. 201180062132.1; Jul. 18, 2014; 10 pages.
Canadian Office Action; Application No. 2,814,708; Sep. 19, 2014; 2 pages.
W3C; "User Agent Accessibility Guidelines 1.0"; http://www.w3.org/TR/2002/REC-UAAG10-20021217/; Dec. 17, 2002; 3 pages.
Unicode; "FAQ—Display of Unsupported Characters"; http://www.unicode.org/faq/unsup_char.html; May 14, 2007; 2 pages.
Australian Office Action; Application No. 2011317582; Nov. 27, 2014; 5 pages.
Korean Office Action as Received in Co-pending Application No. 10-2013-7013006 on Sep. 29, 2014; 3 pages. (No English translation available).
Chinese Office Action; Application No. 2011800621321; Dec. 4, 2014; 15 pages.
Japanese Office Action; Application No. 2013-534325; Nov. 21, 2014; 7 pages.
Chinese Office Action as Received in Co-pending Application No. 201180062132 on Mar. 24, 2015; 5 pages. (No English translation available).
Australian Office Action; Application No. 2011317582; Mar. 16, 2015; 4 pages.

\* cited by examiner

| Hexadecimal Code | Hanzi-G (Chinese simplified) | Hanzi-T (Chinese traditional) | Kanzi (Japanese) | Hanja (Korean) | ChuNom (Vietnamese) |
|---|---|---|---|---|---|
| 6811 | X | X | | | |
| 6812 | X | X | | X | |
| 688C | X | X | | X | X |
| 689E | X | X | | | X |
| 688F | X | X | X | X | X |
| 6884 | X | X | X | | |
| Other example 1 | X | X | X | X | |
| Other example 2 | | | X | X | X |
| Other example 3 | X | X | X | | X |

Table 1

| MCC | Country |
|---|---|
| 460, 461 | China mainland |
| 466 | China Taiwan |
| 440, 441 | Japan |
| 450, 467 | Korea |
| 452 | Vietnam |
| 310-316 | USA |

Table 2

Figure 1

SOLVING CHARACTER DISPLAY AMBIGUITIES

CROSS-REFERENCE TO RELATED APPLICATIONS

This application is a filing under 35 U.S.C. 119 which claims priority to European Patent Application No. 10290179.0 filed Apr. 2, 2010, by Claude Jean-Frederic Arzelier, entitled "Solving Character Display Ambiguities" (38133-EP-EPA-4214-25100), which is incorporated by reference herein as if reproduced in its entirety.

BACKGROUND

As used herein, the term "user equipment" or "UE" might refer to mobile devices such as mobile telephones, personal digital assistants, handheld or laptop computers, and similar devices that have telecommunications capabilities. Such a UE might consist of a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module.

When a UE connects to a Public Land Mobile Network (PLMN), the PLMN typically provides network name information to the UE. The UE then typically displays on its display screen the name of the network to which it is connected. One way in which network name information can be provided to a UE is known as the Network Identity and Time Zone (NITZ) feature, in which the network sends the UE a text string coding the network name. The coding might be performed according to a Global System for Mobile Communications (GSM) default alphabet or an according to International Organization for Standardization/International Electrotechnical Commission (ISO/IEC) Standard 10646, which specifies a universal character set (UCS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 contains tables related to the disclosure.

DETAILED DESCRIPTION

Figure 2:
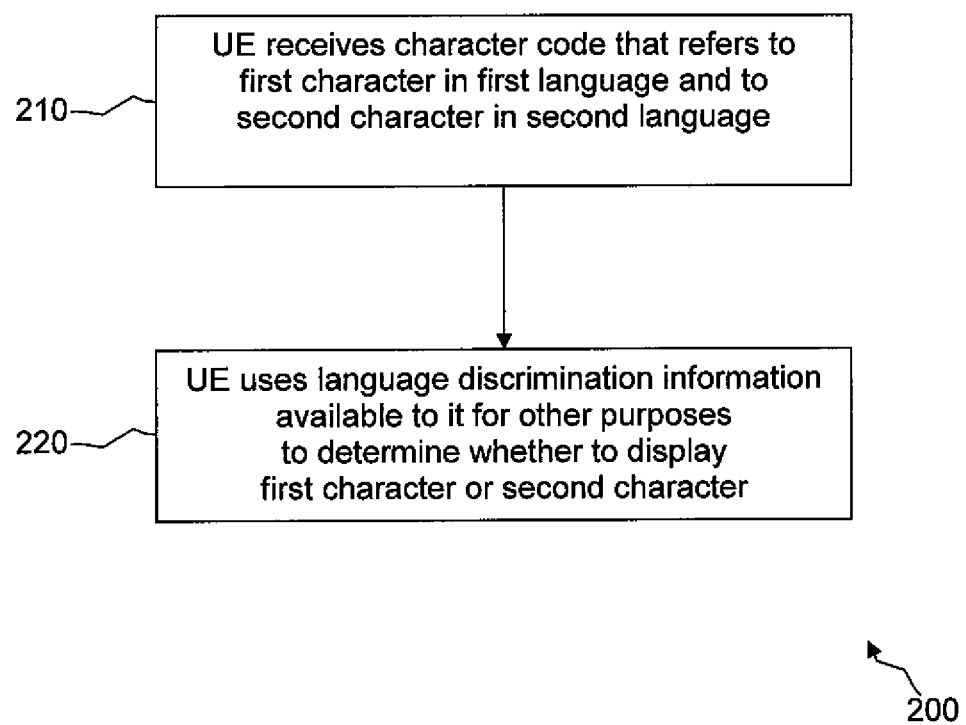
FIG. 2 is a block diagram of a method for decoding an ambiguous character code, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present disclosure provide techniques for resolving ambiguities that may arise in the coding of characters from different languages. As used herein, the terms "ambiguous", "ambiguity", and the like can refer to a single character code that can be decoded as different characters in different languages. An ambiguous character is a character that is encoded by an ambiguous character code. An unambiguous character code is a character code that represents only a single character. While the following discussion focuses on ambiguities that may arise when ISO/IEC Standard 10646 is used for coding in conjunction with the NITZ feature, this description should be considered an example only, and the embodiments described herein may be applicable in other circumstances.

Because the GSM default alphabet coding scheme does not allow for the coding of some additional languages, the ISO/IEC 10646 coding scheme was introduced for NITZ. While the ISO/IEC 10646 coding scheme does allows for the coding of characters in Asian languages, there are some ambiguities as to which Asian language character is represented by a particular hexadecimal code. Table 1 in FIG. 1 illustrates some of these ambiguities. An 'X' symbol in the table indicates that a hexadecimal code in the corresponding row represents a symbol in the language in the corresponding column. It can be seen that the hexadecimal code 6811 could represent either a simplified Chinese character or a traditional Chinese character, the hexadecimal code 6812 could represent a simplified Chinese character, a traditional Chinese character, or a Korean character, the hexadecimal code 688C could represent a simplified Chinese character, a traditional Chinese character, a Korean character, or a Vietnamese character, and so on.

Because of these ambiguities, it may sometimes not be possible for a UE to determine the appropriate character that should be used when a network name is provided to the UE, and the UE could display an incorrect character. For example, if a UE receives the hexadecimal code 6812, the UE could display a Chinese character when a Korean character was intended or vice versa.

Three solutions have previously been discussed to address this issue. First, a "language indicator field" could be introduced as a new information element in the Third Generation Partnership Project (3GPP) standards to indicate the intended language. Second, the ISO/IEC 10646 protocol could be modified so that a way to specify the intended language is introduced. Third, the MM Information, GMM Information, or EMM Information messages in a new protocol or an already existing protocol could be modified to eliminate these ambiguities.

The drawback of these types of solutions is that they require the introduction of new signaling information and hence may require an upgrade to both the network and the UEs. Also, if an new protocol is introduced, the network may need to send data that follows both the new protocol and the old protocol for backwards compatibility, as the network would not know if the UE supports the new scheme or not. Alternatively, a negotiation mechanism could be introduced between the network and the UE, so that the network is aware of what the UE supports and can send information following the appropriate protocol. Procedures (e.g., operations and maintenance) may need to be modified and duplicated in the network so that the network could cope with the two cases of two different populations of UEs co-existing in the network.

Several embodiments are now provided for resolving character code ambiguities without the drawbacks of the previously existing solutions. The embodiments use language discrimination information that is available to the UE for other purposes to resolve or decode ambiguous character codes. Although the different solutions may be described independently, it should be understood that these solutions may in some cases be used independently of one another and may in other cases be used in various combinations with one another.

One set of embodiments uses information provided by the visited PLMN to resolve character code ambiguities. In one of these embodiments, the UE uses the Mobile Country Code (MCC) that is broadcast or signaled by the network in order to determine the language to be used for ambiguous character codes. The network already provides the MCC to the UE for other purposes, so no new signaling is needed. Specifically, the MCC is contained in the PLMN ID that the UE reads in order to decide, for example, whether or not to select or reselect on the PLMN. Several country codes are given in Table 2 of FIG. 1 as examples. The MCC-country mapping shown in Table 2 comes from the ITU-T E212 document, but it should be understood that this is only an example and that other mappings between countries and country codes could be used. It should be noted that an MCC indicates only one physical country (although one country can be referenced by more than one MCC), hence making the discrimination possible.

As an example, a UE might receive the character code 688F. Referring to Table 1 of FIG. 1, it can be seen that 68FF might refer to a simplified Chinese symbol, a traditional Chinese symbol, a Japanese symbol, a Korean symbol, or a Vietnamese symbol. To resolve this ambiguity, the UE could look to the MCC, which the network has already provided to it. Referring to Table 2, if the MCC is 440 or 441, the UE determines that the country is Japan, and the character might be displayed in Japanese. If the MCC is 460, the UE determines that the country is China, and the character might be displayed in simplified Chinese.

Instead of or in addition to using the MCC information from the registered PLMN when an ambiguous character code is received, stored, has been stored or is displayed, the UE could use a history of MCCs that it has received in the past to resolve an ambiguous character code. For example, if the UE is registered to a PLMN with an MCC corresponding to the United Kingdom at the time an ambiguous character code is received, but the five prior registered PLMNs correspond to an MCC corresponding to Japan, the UE could decide to display the ambiguous characters in Japanese. A weighting could be applied to the currently registered MCC and/or the previously registered MCCs. For example, the last registered MCC could count twice as much as the previously registered MCCs in the assessment of the language to use for ambiguous characters codes.

In another of these embodiments, other additional information, such as a Routing Area Identity (RAI) or a Location Area Identity (LAI), that is indicated by the network to the UE and that is normally used for other purposes is used for resolving ambiguities. Those parameters reflect a more specific area where the user is located. For example, in the case of the Chinese language, in main cities users may prefer to have the network name displayed in simplified Chinese, whereas in countryside areas they may prefer traditional Chinese. The RAI and/or the LAI could be used to make this distinction. Other information such as the Mobile Network Code (MNC) that identifies each PLMN within the country could also be used, e.g., in case different PLMNs have different preferences.

Another set of embodiments uses character coding information to resolve character code ambiguities. In one such embodiment, if a UE receives multiple ambiguous character codes but receives at least one unambiguous character code, the UE can use the language of the unambiguous character code to determine the language that should be used for the ambiguous character codes. For example, if the UE receives a character code that could apply to either Chinese, Japanese, or Korean and receives another character code that could apply to either Chinese, Japanese, or Vietnamese, the UE may not be able to determine which language should be used to display the character. If at some point the UE receives a character code that applies only to Chinese, the UE could decide that Chinese should be the language that is used to decode the ambiguous character codes.

In another such embodiment, the UE can use a common language between ambiguous character codes to resolve character code ambiguities. That is, the UE assesses whether there is a language in common between a set of ambiguous character codes and then uses the common language for the display. For example, referring to Table 1 in FIG. 1, if the UE receives the hexadecimal codes 6884 and 6812, it would discover that the only common language between the two is Chinese, since 6884 indicates either Chinese or Japanese and 6812 indicates either Chinese or Korean. Hence, the UE would use Chinese in the display. Also, the UE could use more than two characters in assessing the common language. For example, if the UE receives the coding of a character 'other example 1' (that can possibly reflect Chinese, Japanese, or Korean), also receives the coding for 'other example 2' (that can be Japanese, Korean, or Vietnamese), and also receives the coding for 'other example 3' (that can be Chinese, Japanese, or Vietnamese), the common language is Japanese. The UE would then use Japanese to display the ambiguous character.

It should be noted that this idea might be used only within a set of Asian characters or only within a set of any other ambiguous characters. For example, if the network name indicates a set of English language characters (non-ambiguous coding), followed by a set of Asian language characters, then the UE might perform the above technique only for the Asian characters (or possibly only for the ambiguous Asian characters). The idea above could also be generalized to more than one Asian language within the network name. For example if two sets of Asian characters are separated by a "space character", the above technique could be performed separately for each character string, possibly leading to more than one Asian language. It should also be noted that this technique could be generalized to any Asian languages other than or in addition to the five Asian languages of Table 1 or could be generalized to any non-Asian languages that lead to decoding ambiguity.

In another embodiment that uses character coding information, character codes reflecting seldom-used languages could be used to resolve ambiguous character codes. That is, if a character code could be decoded into a language that is rarely used in modern communication or could be decoded into a language that is commonly used in modern communication, the UE could decode the ambiguous character into the more commonly used language. For example, a UE receiving the hexadecimal code 689E (possibly reflecting either Chinese or Vietnamese) may assess that the language that was intended is Chinese since Vietnamese is rarely used in modern communication. The UE may in turn decide that all other ambiguous Asian character codes are to be decoded in Chinese.

In yet another embodiment that uses character coding information, patterns in languages and/or the network name could be used to resolve character code ambiguities. That is, the UE could detect character patterns or combinations that are typically present in the intended language and then display the ambiguous characters using that language. For example, a sequence of given codes may lead to a character sequence that is more common once displayed in one language rather than another one. Using an example from English—although English does not suffer from this ambiguity in IEC/ISO 10646—a sequence of vowel-followed-by-consonant such as "at" may be more frequent than a sequence of successive consonants such as "mn". Similar pattern detection techniques could be used to resolve ambiguities between different languages. For example, if the code 6812 is followed by the code 688C, it may not be possible to determine whether the intended language was Chinese or Korean. However, if it is known that the sequence of 6812 followed by 688C occurs frequently in Chinese but rarely in Korean, these ambiguous character codes might be resolved or decoded to Chinese.

Also, this technique could be tailored to the network names that are normally provided to the UE. For example, it may be known that, among all the network names that might appear on a UE display, a particular sequence of characters occurs only in the name of one Japanese network. When that sequence is detected in a network name, it can be assumed that the network name should be displayed in Japanese. Therefore, any ambiguous character codes appearing in the network name could be decoded to Japanese.

Another set of embodiments uses home PLMN information to resolve ambiguous character codes. One such embodiment uses the country code from the MSISDN. The mobile station international PSTN/ISDN number (MSISDN), or in other words the telephone number of the SIM/USIM, contains three sub-parameters that are Country Code (CC), National Destination Code (NDC), and Subscriber Number (SN). In an embodiment, the UE uses the Country Code that reflects the country of subscription of the USIM/SIM, and deduces from this the language to use for ambiguous character codes. For example, the Country Code of China is 86, and the Country Code of Japan is 81. The related language could be used accordingly.

In another such embodiment, the International Mobile Subscriber Identity (IMSI), which is used as an identity parameter between the UE and the network or as a way to deduce other identity parameters between the UE and the network, is used to resolve character code ambiguities. The IMSI includes (among other parameters) the MCC and MNC of the home PLMN. Hence, it reflects the MCC of the country of subscription and could be used as a way to decide the language to use for ambiguous character codes. Additionally, if different PLMNs within the same country have different language preferences, the MNC deduced from the IMSI could be used as additional information to deduce the language to be used.

In yet another such embodiment, the UE could use the language of the home PLMN when ambiguous character codes are received. The home PLMN corresponds to the country where the USIM/SIM or the UE was bought. The language of the home PLMN could be preset in the UE or the USIM/SIM.

In still another such embodiment, the home PLMN could use the 'SIM toolkit' feature in order to download a language to use for ambiguous Asian character codes. A new file (or set of files) may be created in the SIM/USIM for this. Alternatively, a list of languages could be provided, to be used by priority order or conditionally (e.g., conditionally to the value of the MCC). It should be noted that this functionality is not restricted to home PLMN use and could also be used by the visited PLMN.

Another set of embodiments uses user information to resolve character code ambiguities. In one such embodiment, the UE uses the language that is chosen by the user for the overall display (or Man-Machine-Interface (MMI)) in order to resolve ambiguous characters codes. For example, if the user has specified that Japanese should be used on the display of a UE, any ambiguous Asian character codes that are received by the UE would be decoded in Japanese.

In another such embodiment, the MMI of the UE could be enhanced in order to give the user the specific option to decide on the language in which to display the network name. As an enhancement, this option could be used only for the ambiguous characters within the network name or only for ambiguous languages, not for all characters of the network name.

In general, any of these solutions could be used on a set of character basis, rather than for the full network name. For example, if the network sends a set of characters using the English language and another set of characters using one or more Asian languages, the UE might use one or more of the schemes above only for the ambiguous Asian characters. Combinations and/or sequential use of the solutions above are of course not excluded. For example, the SIM toolkit solution could be used to update the user option solution or vice versa. It should also be noted that these solutions could be generalized to any Asian languages other than or in addition to the five Asian languages listed in Table 1 or could be generalized to any non-Asian languages that lead to decoding ambiguity.

FIG. 2 illustrates an embodiment of a method 200 for decoding an ambiguous character code. At block 210, a UE receives a character code that refers to a first character in a first language and to a second character in a second language. At block 220, the UE uses language discrimination information available to the UE for other purposes to determine whether to display the first character or the second character.

Figure 3:
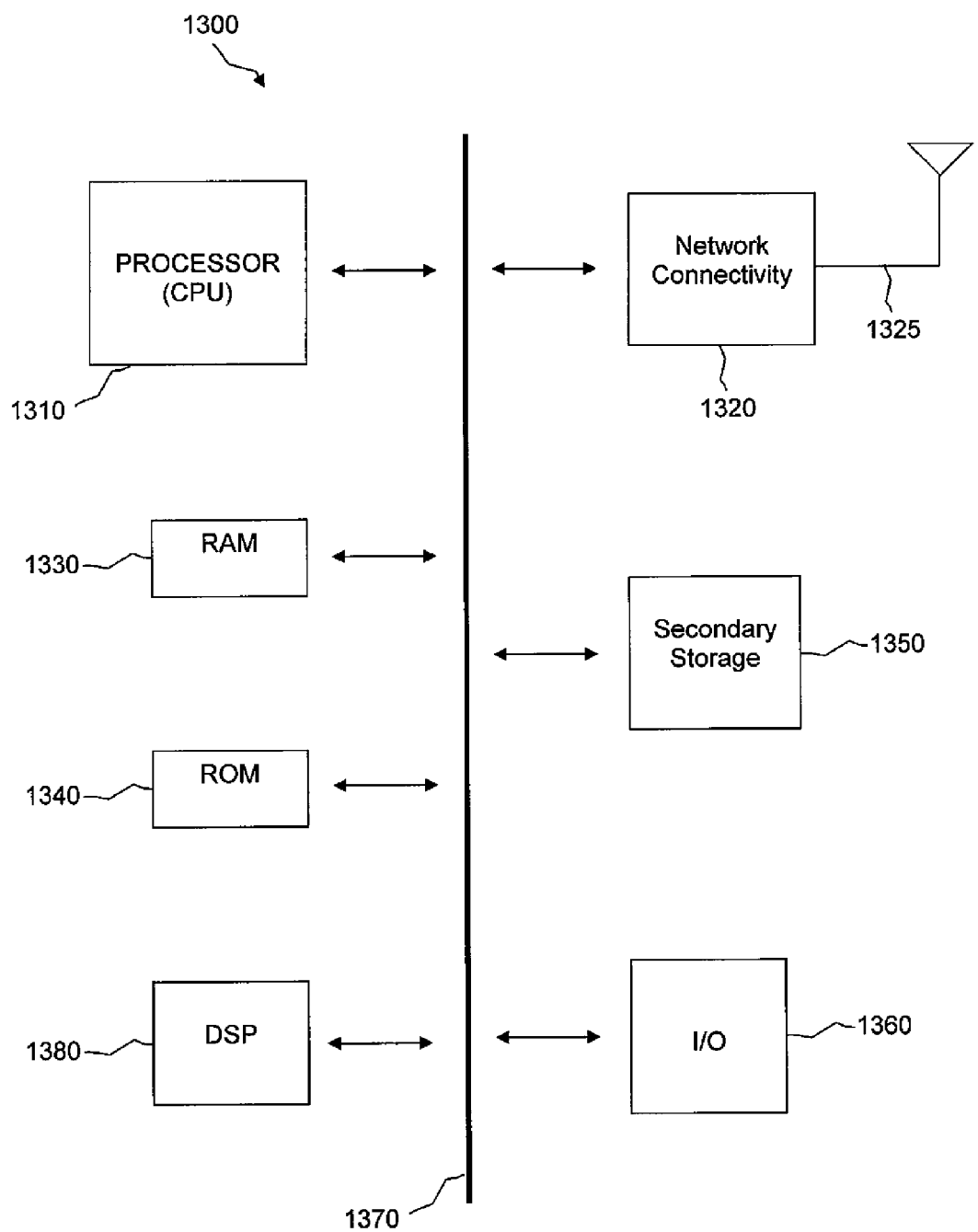
FIG. 3 illustrates a processor and related components suitable for implementing the several embodiments of the present disclosure.

The UE described above might include a processing component that is capable of executing instructions related to the actions described above. FIG. 3 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, UMTS Terrestrial Radio Access System (UTRA), Evolved UMTS Terrestrial Radio Access System (E-UTRA), 3G Long Term evolution (LTE), GSM Edge Radio Access System (GERAN), and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 24.008, and International Telecommunication Union (ITU) Standardization Sector (ITU-T) Document E.212.

The following is an example of a modification that could be made to 3GPP 24.008 in order to implement one or more embodiments disclosed herein: In case of ambiguity between e.g. Asian languages in UCS2, the UE shall use the MCC from the PLMN Identity received on the BCCH to determine which language to use.

In an embodiment, a UE is provided. The UE includes a processor configured such that, when the UE receives a character code that refers to a first character in a first language and to a second character in a second language, the UE uses language discrimination information available to the UE for other purposes to determine whether to display the first character or the second character.

In another embodiment, a method is provided for decoding an ambiguous character code. The method includes a UE receiving a character code that refers to a first character in a first language and to a second character in a second language. The method further includes the UE using language discrimination information available to the UE for other purposes to determine whether to display the first character or the second character.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) comprising:
a processor configured to:
receive one or more hexadecimal codes indicating a name of a network to which the UE is connected, wherein the one or more hexadecimal codes comprise a first character code, and the first character code refers at least to a first character in a first language and to a second character in a second language;
determine whether to display the first character or the second character based on a mobile country code, MCC, provided to the UE by a public land mobile network, PLMN, currently applicable to the UE, wherein the processor determines to display the first character or the second character by mapping the MCC to a country selected from a plurality of countries; and
display the first character or the second character if the country is associated with the first language or the second language, respectively,
wherein the processor is further configured to use the MCC in a mapping table to determine a display language within a set of different languages.

2. The UE of claim 1, wherein the one or more hexadecimal codes include a second character code that refers to only one character.

3. The UE of claim 1, wherein the name of the network is encoded according to International Organization for Standardization/International Electrotechnical Commission (ISO/IEC) Standard 10646.

4. The UE of claim 1, wherein the set of different languages comprises Chinese-G, Chinese-T, Kanzi, Hanja and ChuNom languages.

5. A method for decoding a first character code by a user equipment (UE), comprising:
receiving one or more hexadecimal codes at the UE, wherein the one or more hexadecimal codes comprise the first character code, and the first character code refers at least to a first character in a first language and to a second character in a second language, wherein the one or more hexadecimal codes indicate a name of a network to which the UE is connected;

determining whether to display the first character or the second character based upon a mobile country code (MCC) provided to the UE by a public land mobile network (PLMN) currently applicable to the UE, wherein the determination comprises mapping the MCC to a country selected from a plurality of countries;

displaying the first character or the second character if the country is associated with the first language or the second language, respectively; and using the MCC in a mapping table to determine a display language within a set of different languages.

6. The method of claim 5, wherein the one or more hexadecimal codes include a second character code that refers to only one character.

7. The method of claim 5 wherein the name of the network is encoded according to International Organization for Standardization/International Electrotechnical Commission (ISO/IEC) Standard 10646.

8. The method of claim 5 wherein the set of different languages comprises Chinese-G, Chinese-T, Kanzi, Hanja and ChuNom languages.

9. A non-transitory computer program product containing instructions stored on a tangible computer readable storage medium, which instructions, when executed by a user equipment (UE), perform a method for decoding a first character code comprising:

receiving one or more hexadecimal codes at the UE, wherein the one or more hexadecimal codes comprise the first character code, and the first character code refers at least to a first character in a first language and to a second character in a second language, wherein the one or more hexadecimal codes indicate a name of a network to which the UE is connected;

determining whether to display the first character or the second character based upon a mobile country code (MCC) provided to the UE by a public land mobile network, PLMN, currently applicable to the UE, wherein the determination comprises mapping the MCC to a country selected from a plurality of countries; and displaying the first character or the second character if the country is associated with the first language or the second language, respectively, wherein the instructions, when executed, further perform using the MCC in a mapping table to determine a display language within a set of different languages.

10. The non-transitory computer program product of claim 9, wherein the one or more hexadecimal codes include a second character code that refers to only one character.

11. The non-transitory computer program product of claim 9, wherein the name of the network is encoded according to International Organization for Standardization/International Electrotechnical Commission (ISO/IEC) Standard 10646.

12. The non-transitory computer program product of claim 9, wherein the set of different languages comprises Chinese-G, Chinese-T, Kanzi, Hanja and ChuNom languages.

\* \* \* \* \*